March 7, 1961     A. BURSTEIN     2,973,846

CLUTCH CONTROL

Filed April 16, 1957

INVENTOR.
Albert Burstein
BY
ATTORNEY.

United States Patent Office 2,973,846
Patented Mar. 7, 1961

2,973,846

CLUTCH CONTROL

Albert Burstein, Drexel Hill, Pa., assignor to Radio Corporation of America, a corporation of Delaware Filed Apr. 16, 1957, Ser. No. 653,114

3 Claims. (Cl. 192—22)

This invention relates to a control means for an overrunning clutch, and more particularly to an actuating means for selectively engaging and disengaging an overrunning clutch to provide a predetermined output rotation.

The invention is illustrated with a self-contained, oneway driving clutch having a rotatable control member adapted for manual operation. A well-known example of this type of clutch is a helical-spring clutch wherein the clutch is actuated by movement of coils at or near a normally free end of a helical spring to cause other coils of the helical spring to wind or expand into locking engagement with cooperating clutch drums or pairs of drums.

An object of this invention is to provide a simple and efficient actuator assembly for selective control of an overrunning clutch.

Another object of this invention is to provide an improved actuating assembly to produce one revolution of an overrunning clutch.

A further object of this invention is to provide an improved electromagnetic actuating means for producing two revolutions of an overrunning clutch in one actuating cycle of the electromagnetic means.

A still further object of this invention is to provide an improved electromagnetic actuating means for an overrunning clutch to produce two controlled single revolutions of a one-way clutch regardless of the duration of the electrical control pulse for the electromagnetic means.

The invention is adapted for use with an overrunning clutch having a rotatable control member which is provided with a projecting lug. When the control member rotates, the lug travels in a circular path. The actuator includes an arm having spaced parallel fingers. The arm is movable between a first and second position to position, respectively, one or the other of the fingers in the path of the lug in order to stop the rotation of the control member. The fingers lie in a plane substantially perpendicular to the path of the lug and are spaced to permit the lug to pass between them as the arm is moved between the first and second positions.

The novel features of the invention, as well as additional objects and advantages thereof, will be understood more fully from the following description when read in connection with the accompanying drawing, in which.

Figure 4:
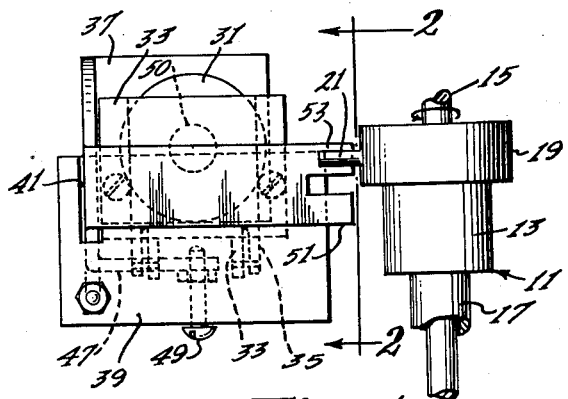
Figure 4 is a bottom view of the assembly of Figure 2.

Referring now in more detail to the drawing, an overrunning clutch 11 to be controlled, best shown in Figure 4, includes a housing 13, an input shaft 15, which may extend completely through the housing 13, and an output shaft 17. A rotatable control collar 19, mounted on the housing 13, includes a radially projecting lug 21. The clutch is of the type wherein the output shaft 17 is disengaged from the input shaft 15, which may be continuously rotating, when the control collar 19 is restrained from rotation. When the restraint is taken away from the collar 19, the output shaft is coupled to the input shaft and the entire clutch assembly rotates. The clutch is disengaged by again interrupting the rotation of the control collar.

The actuator assembly for the clutch 11 normally restrains the collar 19 from rotation through engagement of the lug 21. The assembly provides for the selective release of the lug 21 to permit single revolutions of the control collar and the clutch output shaft 17.

The actuator assembly comprises a cylindrical coil 31 mounted in an L-shaped mounting frame 33. The mounting frame 33 is secured to the base of the coil 31 and extends along one side thereof. The mounting frame may be secured to a bracket (not shown) for supporting the entire actuator assembly. A magnetic armature 35 is pivotally secured to the frame at the upper end of the coil and lies across the top of the coil. An arm 37 in the form of a C-shaped strip is rigidly secured to the armature 35 by means of its upper transverse leg. The central vertical leg of the arm 37 lies adjacent one side of the coil. The lower transverse leg of the arm 37 lies across the base of the coil and is spaced from the coil. The arm is secured to the armature so that, when the armature is pivoted, the central leg of the arm moves in its own plane. A guide member 39 is secured to the frame 33 at the base of the coil and includes a slot 41 for guiding the central leg of the arm 37 when it is moved by the armature.

The arm 37 includes a leg 43 which extends transversely from, and in the plane of, its central leg. A tension spring 45, secured between the leg 43 and the guide member 39, biases the arm 37 to pivot the armature 35 away from the end of the coil 31. In order to limit this movement of the arm and armature, the arm 37 is provided with a leg 47 which extends from its central leg substantially parallel to the transverse legs thereof. The leg 47 supports an adjustable screw 49 which is adapted to bear against the frame 33. This screw may be adjusted to provide the desired movement of the arm 37 and defines one position of the arm 37, illustrated in Figure 1. The other position of the arm is illustrated in Figure 2 and is defined by a stop member 50 at the upper end of the coil 31. The member 50 limits the movement of the arm and armature when the coil is energized.

The lower leg of the arm 37 is bifurcated to define spaced fingers 51 and 53. The above described actuator assembly is mounted with respect to the clutch 11 so that one of the fingers 51 or 53 lies in the path of the rotating lug 21 in each of the respective positions of the arm 37 described above. The fingers are spaced so that, as the arm 37 is moved between these two positions, the lug is permitted to pass between the fingers.

Figure 1:
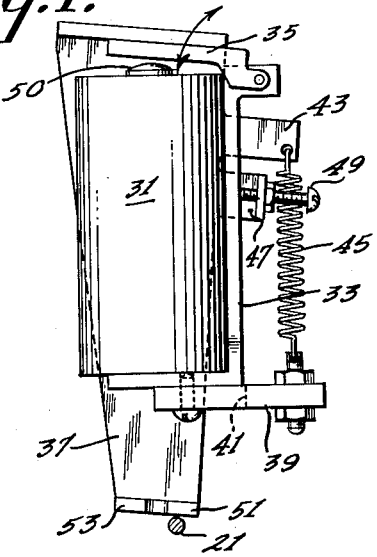
Figure 1 is a view, in front elevation, of a solenoid controlled actuator assembly in which the solenoid is de-energized.
Figure 2:
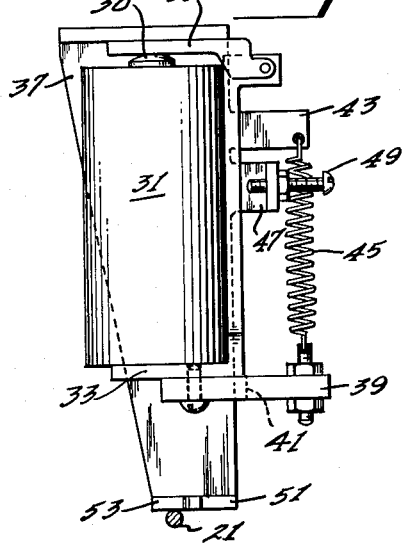
Figure 2 is a view similar to Figure 1 in which the solenoid is energized.
Figure 3:
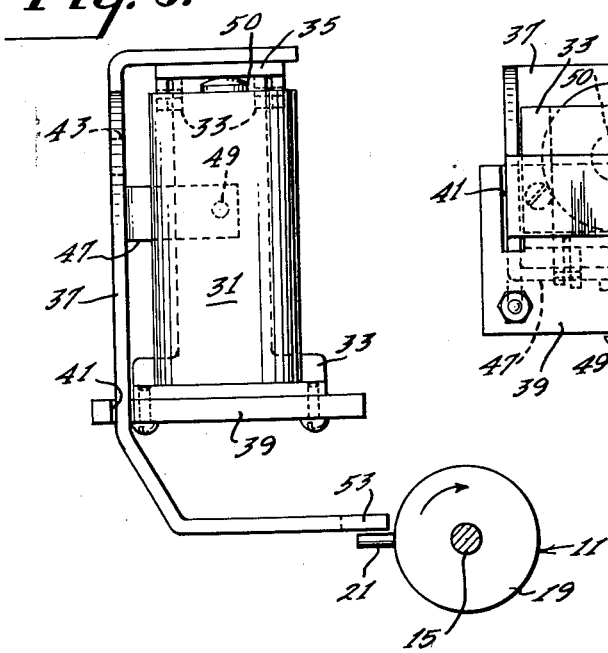
Figure 3 is a view, in side elevation, of the assembly of Figure 2.

In operation, the normal position of the actuator assembly is that shown in Figure 1. In this position, the finger 51 lies in the path of the lug 21 and prevents rotation of the collar 19. When the solenoid coil 31 is energized, the arm 37 is moved to the position shown in Figure 2. During movement of the arm, the lug 21 is released through the slot between the fingers and the collar 19 is permitted to rotate. The speed of rotation is such that when the collar completes one revolution, the finger 53 is positioned in the path of the lug 21 and stops the rotation of the collar 19. When the solenoid coil 31 is de-energized, the arm 37 is returned to the normal position by the spring 45 permitting another revolution of the collar 19. In this manner, for each cycle of operation of the solenoid (energize and de-energize) two complete and independent revolutions of the clutch are provided. A feature of the invention is that the actuator provides for two complete and independent revolutions of the clutch regardless of the elapsed time for the solenoid control cycle.

What is claimed is:

1. An actuator for an overrunning clutch having a rotatable control member, said control member having a projecting lug positioned for movement in a circular path, said actuator comprising an arm movable between a first and second position, said arm having spaced fingers each adapted to lie in the path of and obstruct said lug for a respective position of said arm, said fingers lying in a plane substantially perpendicular to the path of said lug and being rigidly spaced to permit said lug to pass therebetween, and means including electromagnetically operable control means for selectively moving said arm between said first and second positions, said arm effecting release of said rotatable control member twice during each operating cycle of said electromagnetically operable control means to allow two revolutions of said rotatable control member in two independent single revolution steps.

2. In combination with a movable member whose motion is to be controlled, said member having a projecting portion positioned for movement in a first plane, motion control means comprising: an energizable electromagnetic device having a pivotally mounted armature movable from a first position to a second position when said device is energized; an arm secured to said armature and movable therewith; and biasing means urging said arm toward said first position, said arm having rigidly spaced fingers each adapted to lie in the path of and obstruct said projecting portion for a respective said position of said arm, said fingers lying in a second plane substantially perpendicular to said first plane and being spaced to permit said projecting portion to pass therebetween as said arm moves between said first and said second position.

3. An actuator for use with an overrunning clutch having a rotatable control member, said control member effecting engagement of said clutch when it is permitted to rotate, said control member having a projecting lug positioned for movement in a circular path, said actuator comprising a solenoid having a mounting frame, an armature pivotally mounted on said frame, an arm rigidly secured to said armature, means associated with said arm and said armature for limiting the movement of said arm between a first and second position, means urging said arm and said armature towards said first position, said arm having spaced parallel fingers each adapted to lie in the path of and obstruct said lug in a respective position of said arm, said fingers lying in a plane substantially perpendicular to the path of said lug and being fixedly spaced with respect to each other to permit said lug to pass therebetween, and said solenoid effecting movement of said arm to said second position when energized to effect release of said control member to engage said clutch for rotation of equal angular distances twice during each operating cycle of said solenoid.

References Cited in the file of this patent

UNITED STATES PATENTS

| 288,623 | Crane | Nov. 20, 1883 |
| 1,070,577 | Benecke | Aug. 19, 1913 |
| 2,282,084 | Nichols et al. | May 5, 1942 |
| 2,376,304 | Anderson | May 15, 1945 |
| 2,797,786 | Engle et al. | July 2, 1957 |
| 2,815,107 | Hoyt | Dec. 3, 1957 |

FOREIGN PATENTS

| 498,120 | France | Oct. 7, 1919 |